H. E. Shaffer.
Fruit Jar.
No. 3,780. Reissued Dec. 28, 1869.
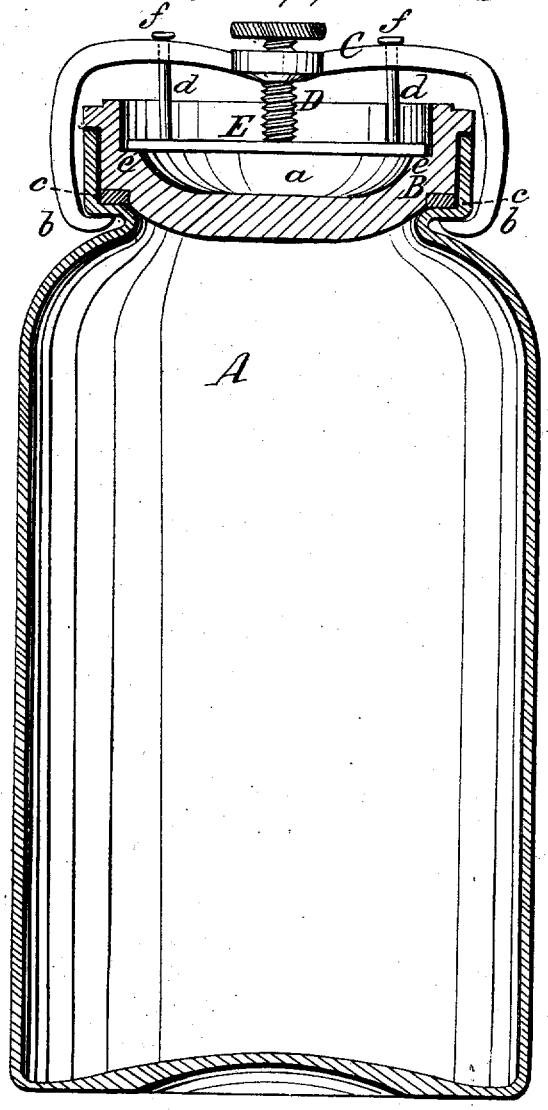
WITNESSES
R. F. Ogrr S.
Geo. H. Mott
INVENTOR.
Henry E. Shaffer.
By J. Fraser & Co
Atty.
N. PETERS, PHOTO-LITHOGRAPHER, WASHINGTON, D.C.

UNITED STATES PATENT OFFICE.

HENRY E. SHAFFER, OF ROCHESTER, NEW YORK.

IMPROVEMENT IN FRUIT-JARS.

Specification forming part of Letters Patent No. 94,218, dated August 31, 1869; Reissue No. 3,780, dated December 28, 1869.

*To all whom it may concern:*

Be it known that I, HENRY E. SHAFFER, of the city of Rochester, in the county of Monroe and State of New York, have invented a certain new and useful Improvement in Fruit-Jars; and I do hereby declare that the following is a full and exact description of the same, reference being had to the accompanying drawing, in which the figure represents a central vertical section of my improved jar.

My invention consists in combining with a hollow-topped cover a spring-bar and a clamp, either connected or disconnected, so arranged as to give the said cover a degree of elasticity when fixed in place, as hereinafter described.

In the drawing, A indicates the jar, and B the cover, the latter having a sunken center, *a*, which leaves a raised shoulder or bearing, *e*, all around, as clearly shown. A clamp, C, rests over the top of the jar, having claws *b b*, which catch under the shoulder *e*, or equivalent lugs blown in the jar-neck. Through the center of this clamp passes a screw, D, its lower end resting on the middle of a spring-bar, E, which extends across the cavity *a*, and rests on the shoulder *e*, on opposite sides of the cover. If desired, guide-pins *d d* may connect the spring-bar with the clamp, or they may be dispensed with, making the screw the only connection; and, if desired, the spring-bar and clamp may be entirely independent of each other, only that when the parts are all in place the screw bears down upon the spring-bar to produce the necessary pressure. It is best, however, to make some connection between the spring-bar and clamp, so that all the parts may be taken off together.

The novelty in this invention consists in the combination of the spring-bar, clamp, and screw, or its equivalent, with a cover having the hollow top *a*. It is only by this concavity that the elastic effect is produced. The ends of the spring-bar bearing upon opposite sides produce the desired pressure, while at the same time the elastic effect is produced by the bar being unsupported in the center. By this means I avoid the use of coiled and other expensive springs, which are difficult to adjust in place, and substitute in their place a simple bar, which may be of malleable iron, or cut from a sheet or strip of wrought metal. This form of the clamping apparatus also enables me to use a cover which packs directly down upon a shoulder blown in the jar. There is no peculiarity about the cover except the concave top and the bearing-surface *e*.

I am aware that the clamp and the screw are both old. I am also aware that the bar has been before used, but in other relations. I do not claim these individually, nor do I claim them combined, except when they are used in connection with the cover having the concave top, so as to produce a natural spring of the bar.

What I claim as my invention is—

The arrangement of the clamp C, spring-bar E, and screw D, either connected or disconnected, when combined with the cover B, having the concavity *a*, whereby a natural spring of the bar is allowed for giving elasticity to the cover, as herein described.

H. E. SHAFFER.

Witnesses:
R. F. OSGOOD,
CHAS. F. SPENCER.